(12) United States Patent
Solka

(10) Patent No.: US 8,784,256 B2
(45) Date of Patent: Jul. 22, 2014

(54) POWER DIVIDER

(75) Inventor: Ulrich Solka, Fuerstenzell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1 day.

(21) Appl. No.: 13/821,406

(22) PCT Filed: Aug. 3, 2011

(86) PCT No.: PCT/EP2011/063337
§ 371 (c)(1),
(2), (4) Date: Mar. 7, 2013

(87) PCT Pub. No.: WO2012/034782
PCT Pub. Date: Mar. 22, 2012

(65) Prior Publication Data
US 2013/0178324 A1    Jul. 11, 2013

(30) Foreign Application Priority Data
Sep. 16, 2010  (DE) .......................... 10 2010 040 883

(51) Int. Cl.
*F16H 37/08* (2006.01)
*F16H 37/00* (2006.01)
*B60K 17/344* (2006.01)
*B60K 17/346* (2006.01)

(52) U.S. Cl.
CPC .......... *F16H 37/0833* (2013.01); *B60K 17/344* (2013.01); *B60K 17/3467* (2013.01)
USPC ..................................... 475/206; 74/665 GA

(58) Field of Classification Search
USPC ............... 74/665 GA; 475/198, 206
See application file for complete search history.

(56) References Cited

U.S. PATENT DOCUMENTS

| | | | |
|---|---|---|---|
| 2,805,586 A * | 9/1957 | Lucas | 74/665 GA |
| 3,046,813 A | 7/1962 | Bixby | |
| 3,269,217 A * | 8/1966 | Hoitan | 475/206 |
| 3,470,766 A * | 10/1969 | Schreiner et al. | 74/665 T |

(Continued)

FOREIGN PATENT DOCUMENTS

| | | |
|---|---|---|
| DE | 2 252 050 | 5/1974 |
| DE | 34 39 899 A1 | 6/1985 |

OTHER PUBLICATIONS

German Search Report Corresponding to DE 10 2010 040 883.2.
International Search Report Corresponding to PCT/EP2011/063337.

(Continued)

*Primary Examiner* — Dirk Wright
(74) *Attorney, Agent, or Firm* — Davis & Bujold, PLLC; Michael J. Bujold

(57) ABSTRACT

A power divider for a drive of a continuously driven first wheel axle and another engageable wheel axle. The power divider has an input shaft, which is driven by a manual transmission, and a coaxial first output shaft. The first output shaft drives the continuously driven wheel axle. An intermediate shaft is disposed in the countershaft and drives a second output shaft. The first output shaft can be selectively driven, via a first clutch, with either direct or reduced transmission. This clutch is fixed to the input shaft and, in a first position for direct transmission, connects the input shaft directly to the first output shaft. Furthermore, the first clutch, in a second position, couples a first input gear to the input shaft, and drives the first output shaft, via the countershaft formed on the intermediate shaft, to drive the first output shaft at a reduced speed.

12 Claims, 3 Drawing Sheets

(56) References Cited

U.S. PATENT DOCUMENTS

| | | | |
|---|---|---|---|
| 3,753,376 A * | 8/1973 | Ribeiro | 74/665 GA |
| 3,999,447 A * | 12/1976 | Halberg | 475/203 |
| 4,188,838 A * | 2/1980 | Nakao et al. | 475/223 |
| 4,292,860 A | 10/1981 | Kako et al. | |
| 4,559,846 A | 12/1985 | Cochran et al. | |
| 4,605,084 A | 8/1986 | Haynes et al. | |
| 5,405,300 A * | 4/1995 | Sakita | 475/225 |
| 6,840,881 B2 * | 1/2005 | Ma et al. | 475/203 |
| 6,843,151 B2 * | 1/2005 | Ma et al. | 74/640 |
| 6,848,337 B2 * | 2/2005 | Ma et al. | 74/640 |
| 8,499,658 B2 * | 8/2013 | Klemm et al. | 74/377 |

OTHER PUBLICATIONS

Written Opinion Corresponding to PCT/EP2011/063337.
International Preliminary Report on Patentability Corresponding to PCT/EP2011/063337.

* cited by examiner

POWER DIVIDER

This application is a National Stage completion of PCT/EP2011/063337 filed Aug. 3, 2011, which claims priority from German patent application serial no. 10 2010 040 883.2 filed Sep. 16, 2010.

FIELD OF THE INVENTION

The invention relates to a power divider for a drive of a continuously driven first wheel axle and at least one further engageable wheel axle of a motor vehicle, comprising an input shaft, which can be driven by a manual transmission, and a first output shaft extending coaxially therewith, which is used to drive the continuously driven wheel axle, comprising an intermediate shaft, which is assigned to the input shaft and the first output shaft and is disposed in the countershaft, and comprising a second output shaft, which is driven by the intermediate shaft via a gear pairing and is used to drive the other engageable wheel axle, wherein the first output shaft can be driven selectively with direct transmission or a reduction via a first shifting clutch.

BACKGROUND OF THE INVENTION

Motor vehicles are equipped with multiaxial drives in order to improve traction behavior and increase the maximum transferrable torque. Drive concepts are utilized in off-road utility vehicles, Trac-vehicles and construction machinery, in particular, that comprise a plurality of driven wheel axles, in which all wheel axles are driven permanently or in a partially selectively engageable or disengageable manner via power divider that is separate or is flange-mounted on the manual transmission housing. Manufacturers of utility vehicles who equip such vehicle types with an all-wheel drive and a rear-axle drive consider it highly significant that, in both cases, the entire design of the utility vehicle is substantially identical. One objective is to retain a low position of the driver's cab of the utility vehicle even when the utility vehicle is equipped with an all-wheel drive. A large misalignment between an output flange of the power divider and an input element to the rear axle, which would result in a large bending angle of the corresponding Cardan shaft, can be prevented in that the input shaft connected to the manual transmission is disposed coaxially with the output shaft functioning as the rear-axle drive. A Cardan shaft extending into the front axle as an input is thereby routed laterally past the manual transmission and the internal combustion engine.

A power divider which fulfills the aforementioned prerequisites for the drive of two wheel axles, is known from DE 22 52 050 B2. This power divider having a coaxial disposition of the input shaft and first output shaft comprises, apart from a shaft train for an auxiliary drive branching off of the power divider on both sides, four further shaft trains for shifting while idling or in two drive stages. The drive stages can have direct transmission or gear ratio, and a gear reduction. A separate shaft section accommodating an intermediate gear is installed within the shaft train containing the input shaft and the first output shaft, wherein this intermediate gear meshes with a gearwheel that is freely rotatable on the one intermediate shaft and can be coupled thereto, and meshes with a crown wheel of a differential gear. This is a power divider that permanently drives both wheel axles, i.e. the rear axle and the front axle, because the drive of the front axle cannot be disengaged.

SUMMARY OF THE INVENTION

The problem addressed by the present invention is that of developing a power divider of the aforementioned type such that the drive of an engageable wheel axle and range group shifting can be engaged or disengaged despite a reduction in the number of components required. The structural dimensions of the power divider shall also be reduced, thereby allowing this to be easily accommodated within the installation space delimited by the vehicle frame.

The first shifting clutch is disposed directly on the input shaft and, in a first shift position for direct transmission, connects the input shaft directly to the first output shaft or an output gear disposed thereon, and the first shifting clutch, in a second shift position, couples a first input gear, which is freely rotatably mounted on the input shaft, to the input shaft and drives the first output shaft via the countershaft formed on the intermediate shaft, whereby the first output shaft is driven at a reduced speed of rotation. This disposition of the shafts and the first shifting clutch results, overall, in a marked reduction in the required number of components and the outer dimensions of the power divider. This first shifting clutch can assume two different shift positions, wherein the shifting clutch connects the input shaft to the first output shaft for direct fixed drive, or couples the first input gear to the input shaft in order to reduce the speed of rotation of the first output shaft relative to the speed of rotation of the input shaft, and therefore the first output shaft is driven via the countershaft in this off-road gear. Creating a direct fixed drive makes it possible to reduce the height of the power divider relative to the position of the input shaft, and so the space for the configuration of a driver's cab in utility vehicles is not limited, i.e. the cab can assume a relatively low position. The power divider must be designed such that the continuous Cardan shaft between the transmission and the axle of a standard 4×2 truck can be retained. Given that, in the power divider, the input shaft is not offset relative to the output shaft, the engine-transmission unit is slightly offset relative to the rear axle, thereby allowing the driver's cab to remain low. In place of a first shifting clutch that performs either function, it is also possible to provide two separately disposed shifting clutches, i.e. one for the direct fixed drive and one for fixing a first gearwheel on the intermediate shaft or to a component of a differential gear. These separately disposed shifting clutches can have opposing actuating directions for the engagement procedure thereof, thereby allowing these to be actuated in alternation by means of a shift rod.

Alternatively, the first shifting clutch should be disposed directly on the input shaft and, in an engaged shift position for direct transmission, should connect the input shaft directly to the first output shaft. This corresponds to the first range group, in which the vehicle is driven in a road group. Furthermore, a first input gear, which is connected to the input shaft in a rotationally fixed manner, should be engaged with a first gearwheel, which, in a second range group corresponding to an off-road gear, and in the case in which a differential is not provided, can be coupled to the intermediate shaft or to a component of a differential gear via a third shifting clutch, wherein the first output shaft is driven at a reduced speed of rotation via the countershaft formed on the intermediate shaft. Direct transmission means that the first output shaft is driven 1:1 by the input shaft. According to this second solution, the first shifting clutch is therefore not in the form of a double clutch; instead, single clutches are provided between the input shaft and the first output shaft, and between the first gearwheel and the intermediate shaft or a component of the differential gear.

In contrast, in the power divider according to DE 22 52 050 B2, the design complexity is substantially increased in that there is no direct fixed drive from the input shaft to the output shaft. Instead, the input shaft drives a first intermediate shaft with step-up or reduction, depending on the shift position of a shifting clutch belonging to assembly B. By way of this first intermediate shaft, a differential gear disposed on a second intermediate shaft is driven via a further shifting clutch and an intermediate gear. An output shaft of the differential gear then drives the output shaft that extends to the rear axle, via a further gear pairing. The use of four shaft trains substantially increases the construction space compared to the solution according to the invention, and markedly increases the external dimensions of the power divider.

Particularly advantageously, the power divider according to the invention is designed such that an extended section of the intermediate shaft accommodates a second input gear, which is freely rotatable thereon and is engaged with a second output gear disposed on the second output shaft and can be connected to the extended section via a second shifting clutch. This second shifting clutch is used to selectively engage or disengage the drive of a front axle.

Alternatively, a shaft stub, which is connected in a rotationally fixed manner to a second input gear, can be disposed coaxially with the intermediate shaft, the shaft stub being rotatably mounted in the intermediate shaft, wherein the input gear is engaged with a second output gear disposed on a second output shaft, and the shaft stub can be coupled to the intermediate shaft via a second shifting clutch. It is also possible, of course, to dispose the second shifting clutch on the second output shaft in order to selectively connect the second output gear thereto. Furthermore, the second shifting clutch can be combined with or replaced by a friction-locking or form-locking element that limits the torque that can be transferred to the front axle.

In a further embodiment of the invention, a differential gear should be disposed within the intermediate shaft, the components of which are connected to a first and a second gearwheel and to a second input gear, wherein the second input gear is engaged with a second output gear disposed on the second output shaft. In the off-road gear, the differential gear therefore performs the function of an interaxle differential, in that, in the slip-free operation of the vehicle, a planetary set rotates entirely or almost entirely as a solid unit. To this end, the transmission ratios of the wheel chains are selected such that, with consideration for the tire circumferences, no differences in rotational speed, i.e. no compensation motions, occur at the differential gear in slip-free operation. Due to the shaft and gear dispositions according to the invention, it is possible, using simple means, to adapt the particular front-axle transmission ratio that is required to the rear-axle transmission ratio provided in the all-wheel drive mode. To this end, the number of teeth of the second input gear and that of the second output gear must be changed accordingly.

It is also possible, within the scope of the invention, to design the differential gear in the form of a spur-gear planetary drive spatially disposed between the first and the second gearwheel. The spur-gear planetary drive has small axial dimensions, which substantially correspond to those of the first shifting clutch. The result thereof is an extremely compact configuration and, therefore, a reduction in the overall axial length of the power divider. It is advantageous when the components of the spur-gear planetary drive connect a carrier to the first gearwheel, a ring gear to the second gearwheel, and a sun gear to the second input gear.

In a further development of the invention, a locking clutch, which is used to lock the differential gear, is disposed between the carrier and the sun gear, the locking clutch coupling the first gearwheel, which is driven by the first input gear, to the second input gear in the event of direct transmission from the input shaft to the first output shaft. In the off-road gear, in which both wheel axles are driven with reduction, the differential gear can therefore be locked using the locking clutch in extreme states of slippage, which preferably occur at one of the two wheel axles. In the design of the power divider as an interaxle differential, this locking clutch is disposed in the region in which the second shifting clutch is intended to be provided in the previously explained version without an interaxle differential. It is thereby possible to vary the power divider according to the requirements in the same manner as that in a modular system, while retaining the housing design and all the essential drive components, and to thereby adapt the power divider to the requirements. Furthermore, the locking clutch can be combined with or replaced by a friction-locking or form-locking element that limits the torque that can be transferred to the front axle.

In particular when the utility vehicle is intended to be equipped with an auxiliary drive shaft for driving separate devices, it can be advantageous to connect the auxiliary drive shaft to the carrier and thereby extend same through the second gearwheel. Therefore, the carrier is connected to the first gearwheel and to the shaft extending to the auxiliary drive. The auxiliary drive shaft can transfer torque when the ring gear is locked, wherein the first gearwheel and the second input gear are decoupled from the sun gear. In order to hold or brake the ring gear, the rear axle is locked in a force-locking or form-locking manner via a parking lock or a parking brake. Alternatively thereto, the first shifting clutch can be designed such that it is used only to engage or disengage the direct fixed drive to the first output shaft, while a further shifting clutch is disposed between the carrier and the first gearwheel. The first gearwheel can be engaged with an output gear disposed on an auxiliary drive shaft. Therefore, the auxiliary drive shaft is driven in the shifted off-road group, i.e. in the all-wheel drive mode. This is the case when the vehicle is towed. In both versions for the drive of the auxiliary drive shaft, the auxiliary drive shaft is connected to the carrier of the differential gear. However, when the vehicle is towed, the carrier is driven by the front axle and the rear axle as a summation shaft comprising sun gear and ring gear. As an alternative to these two versions, the speed of rotation of the ring gear could also be transmitted to the auxiliary drive shaft.

The shifting clutches and the locking clutch are preferably designed as claw clutches. The corresponding claw clutches can be equipped with synchronization, if necessary. However, it is also possible to equip one or all clutches with friction-locking driving elements.

Finally, in a further embodiment of the invention, the second output shaft is disposed in a housing separate from a power divider housing, wherein the housing is pivotable about a longitudinal center axis of the intermediate shaft and is fixable in different positions on the power divider housing. Therefore, a drive flange of the second output shaft can be pivoted together with the housing into a position in which the Cardan shaft connected thereto assumes an optimum position relative to the position of the manual transmission, a crankcase, or an oil pan of the internal combustion engine, and an input element into a front-axle gearing, and is driven with a minimum bending angle.

The invention is not limited to the specified combination of features of the independent claims and the dependent claims. In addition, individual features can be combined with one another, provided they arise from the claims, the description of the example embodiments that follows, or directly from the drawing. References in the claims to the drawing via the use of reference characters is not intended to limit the scope of protection of the claims.

BRIEF DESCRIPTION OF THE DRAWINGS

Further measures that improve the invention are depicted in greater detail in the following in combination with the description of advantageous embodiments of the invention. The drawings show.

DETAILED DESCRIPTION OF THE PREFERRED EMBODIMENTS

Figure 1:
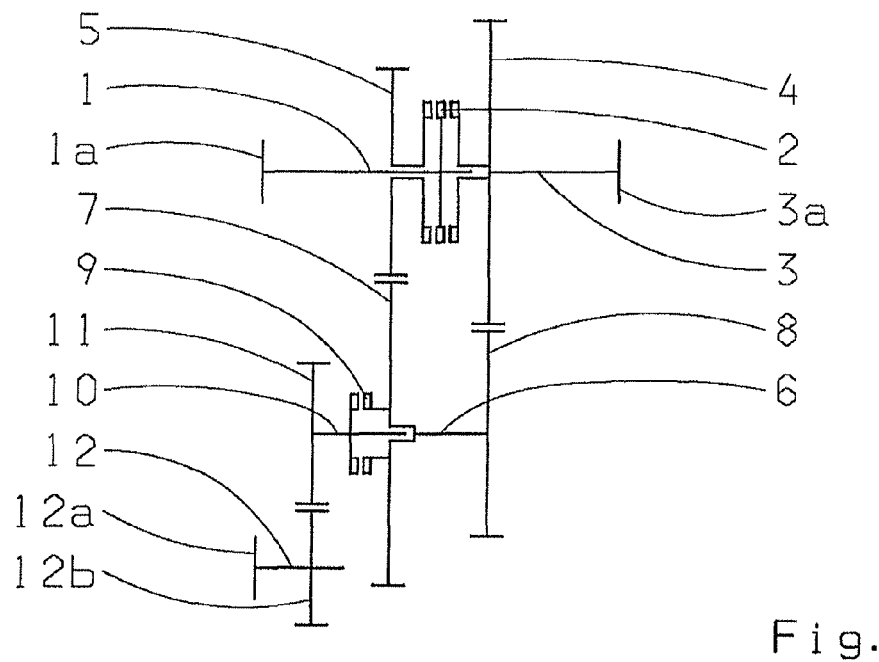
FIG. 1 a schematic depiction of a first embodiment of a power divider according to the invention, FIG. 2 a schematic depiction of a second embodiment, which corresponds, in terms of the shaft configuration, to a section according to line 2-2 in FIG. 3, FIG. 3 a view of a front surface of a power divider comprising a pivotable housing that accommodates a second output shaft, FIG. 4 a schematic depiction of a third embodiment of a power divider having a first drive mode of an auxiliary drive shaft and FIG. 5 a schematic depiction of a second drive mode of an auxiliary drive shaft.
Figure 2:
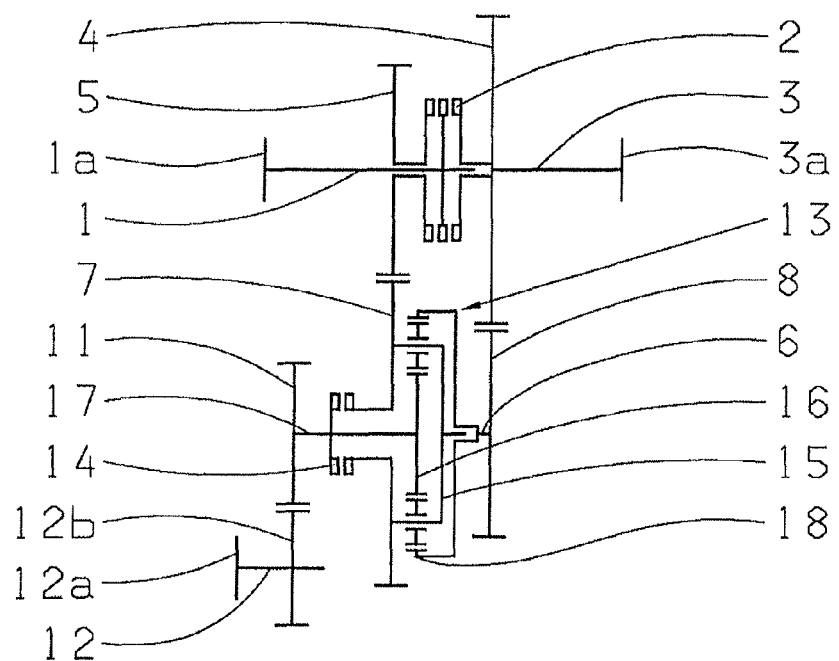
Figure 4:
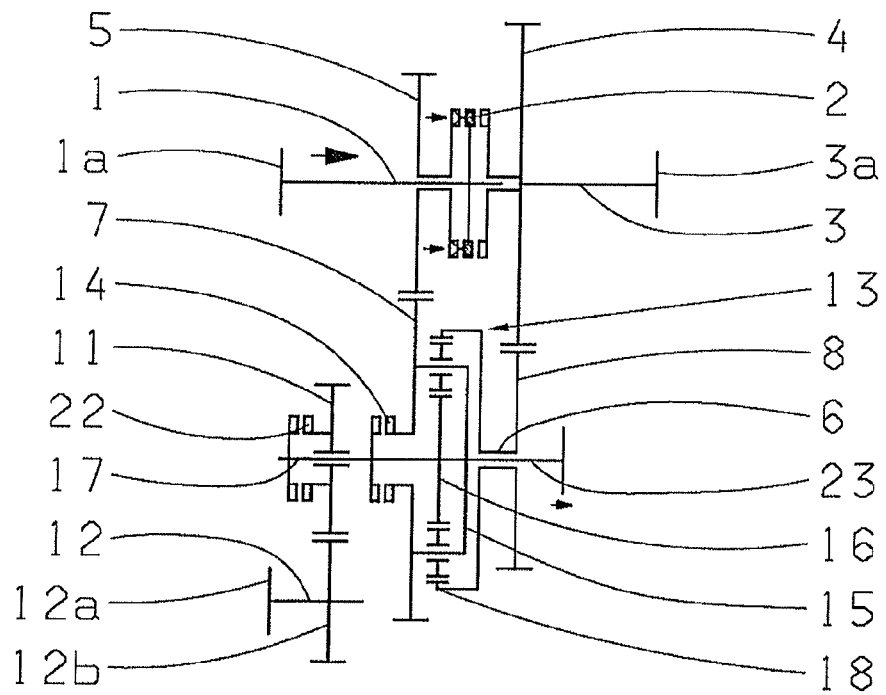

An input shaft of a power divider is labeled "1" in FIGS. 1, 2, and 4, wherein the input shaft is driven at a drive flange 1a, preferably via a Cardan shaft, by a non-illustrated manual transmission of a vehicle preferably designed as a utility vehicle. Of course, the vehicle can also be an agricultural Trac vehicle or a construction machine. A first shifting clutch 2 is disposed on the input shaft 1, via which the input shaft 1 can be selectively coupled to a first output gear 4, which is disposed in a rotationally fixed manner on a first output shaft 3, or to a first input gear 5, which is freely rotatable on the input shaft 1.

Provided the first output gear 4 and the input shaft 1 are coupled to one another via the first shifting clutch 2, direct fixed drive occurs from the input shaft 1 to the first output shaft 3, which is connected via an output flange 3a and, preferably, via a non-illustrated Cardan shaft to a continuously driven rear axle of the vehicle. An intermediate shaft 6 assigned to the input shaft 1 and the first output shaft 3 is disposed in the countershaft. In addition to the intermediate shaft 6, other components of this countershaft are a first gearwheel 7, which is engaged with the first input gear 5, and a second gearwheel 8, which meshes with the first output gear 4.

In the design of the power divider according to FIG. 1, the first gearwheel 7 and the second gearwheel 8 are fixedly connected directly to the intermediate shaft 6. In the previously described direct fixed drive, the rear axle of the vehicle is driven in an indicated rotational speed range that corresponds to operation of the vehicle in a road group of the gear steps that can be shifted in the manual transmission. A reduced range, which can be selected via the first shifting clutch 2 and in which the input shaft 1 drives the first output shaft 3 via the first input gear 5, the first gearwheel 7, the intermediate shaft 6, the second gearwheel 8, and the first output gear 4, corresponds to an off-road group. In this off-road group, a non-illustrated drive axle, which can be a front axle, can also be driven via the intermediate shaft 6. In order to selectively engage or disengage this drive, a second shifting clutch 9 is used, which is disposed on a shaft stub 10 extending freely rotatably in the intermediate shaft 6, and which can couple the shaft stub to the first gearwheel 7. The shaft stub 10 accommodates a second input gear 11, which is disposed thereon in a rotationally fixed manner and is engaged with a second output gear 12b, which is also rotationally fixed on a second output shaft 12. This second output shaft 12 is connected via an output flange 12a to a Cardan shaft extending to an axle drive of the front axle.

The design of the power divider according to FIG. 2 is the same as the basic design according to FIG. 1. However, a differential gear 13 in the form of a spur-gear planetary drive is disposed within the intermediate shaft and functions as an interaxle differential between the rear axle and the front axle in the shifted off-road group and, therefore, in the all-wheel drive mode. The second shifting clutch is omitted in this solution, i.e. the second wheel axle is driven permanently in the off-road group. Instead of the second shifting clutch, a locking clutch 14 is provided, by way of which a carrier 15 can be connected to a sun gear 16. This sun gear 16 is connected via a second drive shaft 17 to the second input gear 11, which drives the output gear 12b disposed on the second output shaft 12, in conformance with FIG. 1. A ring gear 18 is connected to the second gearwheel 8 of the countershaft.

As shown, the solution according to FIG. 2 is nearly identical to the solution according to FIG. 1, despite the use of a differential gear. Therefore, this is basically a transmission design that can be easily adapted as necessary to the particular requirements, without decisive structural changes.

Figure 3:
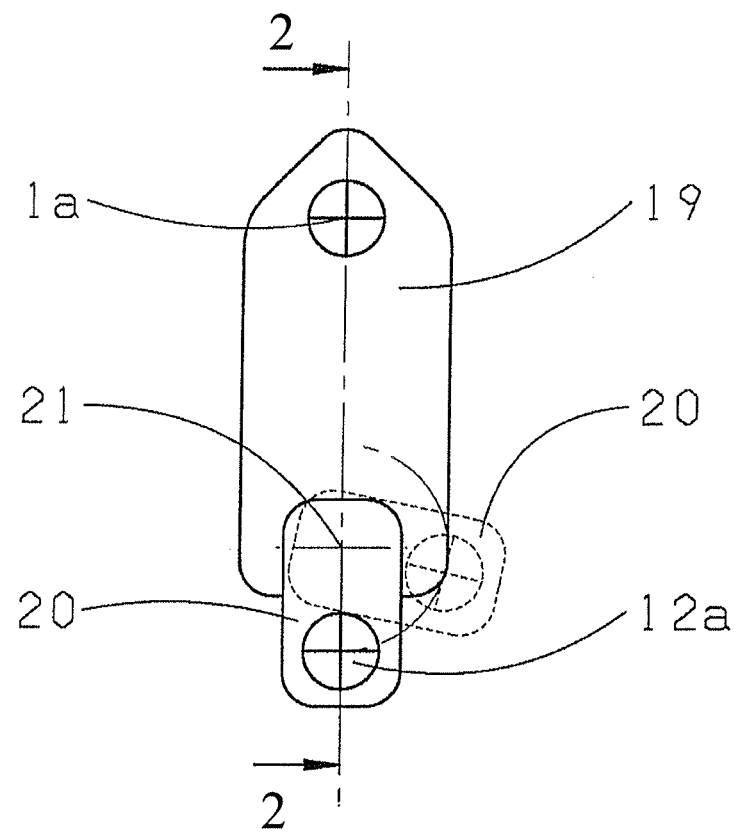

FIG. 3 shows a front surface view of a power divider designed according to the diagram according to FIG. 2. The transmission elements are enclosed by a power divider housing 19 and a housing 20, which is pivotable relative thereto. The drive flange 1a is shown in the upper region of the power divider housing 19, and the output flange 12a connected via a Cardan shaft to the front axle is shown in the lower region of the housing 20. A rotational axis 21 extending centrally through the intermediate shaft is indicated by intersecting segmented lines. The housing 20 can be pivoted about this rotational axis 21 with respect to the power divider housing 19, wherein both housings 19 and 20 can be fastened to one another in different positions. A changed position is illustrated by a broken line. It is therefore possible to optimize the position of the output flange 12a such that a large bending angle of the Cardan shaft can be prevented and the Cardan shaft can be extended past the manual transmission and the internal combustion engine. Likewise, there is no longer a need to provide a plurality of housing variants.

Figure 5:
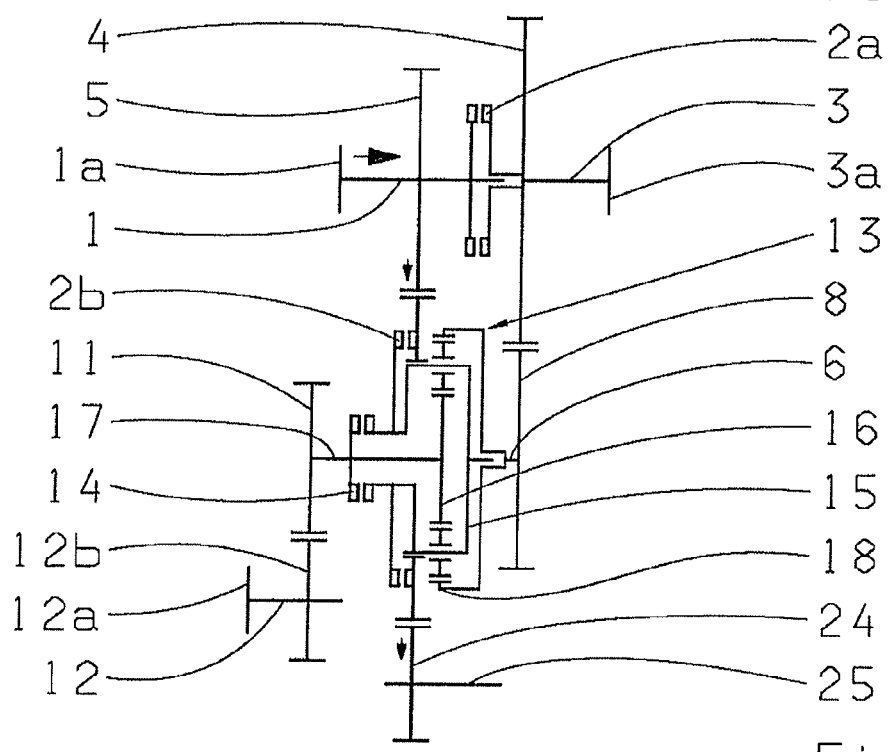

FIGS. 4 and 5 show example embodiments of the invention, which are based on the solution according to FIGS. 1 and 2. These configurations also comprise a differential gear 13 disposed between the first gearwheel 7 and the second gearwheel 8. The components of this differential gear 13, namely the carrier 15, the sun gear 16, and the ring gear 18, are connected to the shafts in the same manner as in FIG. 2.

According to FIG. 4, however, the second input gear 11 can be selectively coupled to or decoupled from the drive shaft 17 via a third shifting clutch 22. An auxiliary drive shaft 23 routed through the second gearwheel 8 of the countershaft also extends from the carrier 15. This auxiliary drive shaft 23, which is also referred to as a PTO shaft, is used to drive external devices. It is implemented when the vehicle is at a standstill, i.e. with the first output shaft 3 locked and with transmission of torque via the first shifting clutch 2 to the first gearwheel 7, and with the remaining clutches (locking clutch 14 and third shifting clutch 22) disengaged. The ring gear 18 rests, via the corresponding gears 4 and 8, against the first output shaft 3. In this manner, an auxiliary drive can be implemented by making a structurally simple change to the power divider.

Finally, FIG. 5 shows an alternative solution with which an auxiliary drive is also created. In this case, a first shifting clutch 2a and a third shifting clutch 2b are disposed between the input shaft 1 and the first output shaft 3, and between the first gearwheel 7 and the carrier 15. A third gear 24, which is fastened to an auxiliary drive shaft 25, engages with the first gearwheel 7 disposed on the carrier 15. In this case, the auxiliary drive shaft 24 can be driven with the differential gear locked or unlocked.

It is therefore possible for the auxiliary drive to rotate when the vehicle is at a standstill, and for the auxiliary drive to be disposed in a spatially flexible manner.

REFERENCE CHARACTERS 1 input shaft
1a drive flange
2, 2a first shifting clutch
2b third shifting clutch
3 first output shaft
3a output flange
4 first output gear
5 first input gear
6 intermediate shaft
7 first gearwheel
8 second gearwheel
9 second shifting clutch
10 shaft stub
11 second input gear
12 second output shaft
12a second output flange
12b second output gear
13 differential gear
14 locking clutch
15 carrier
16 sun gear
17 second input shaft
18 ring gear
19 power divider housing
20 housing
21 rotational axis
22 third shifting clutch
23 auxiliary drive shaft
24 third gearwheel
25 auxiliary drive shaft

The invention claimed is:

1. A power divider for a drive of a continuously driven first wheel axle and at least one further engageable wheel axle of a motor vehicle, the power divider comprising:
   an input shaft (1) being drivable by a manual transmission, and
   a first output shaft (3) extending coaxially therewith, which is used to drive the continuously driven wheel axle,
   an intermediate shaft (6) being assigned to the input shaft (1) and the first output shaft (3) and being disposed in the countershaft, and
   a second output shaft (12) being driven by the intermediate shaft (6), via a pair of gears (11, 12b), and being used to drive the further engageable wheel axle,
   the first output shaft (3) being selectively drivable, via a first shifting clutch (2), with either direct transmission or reduction,
   the first shifting clutch (2) being disposed directly on the input shaft (1) and, in a first shift position for direct transmission, connecting the input shaft (1) directly to either the first output shaft (3) or a first output gear (4) disposed thereon, and the first shifting clutch (2), in a second shift position, coupling a first input gear (5), which is freely rotatably mounted on the input shaft (1), to the input shaft (1) and thereby driving the first output shaft (3), via the countershaft formed on the intermediate shaft (6), and enabling the first output shaft (3) to rotate at a reduced speed of rotation,
   a differential gear (13) being disposed within the intermediate shaft (6),
   components (15, 16, 18) of the differential gear being connected to a first (7) and a second gearwheel (8) and to a second input gear (11), and the second input gear (11) being engaged with a second output gear (12b) disposed on the second output shaft (12).

2. The power divider according to claim 1, wherein the differential gear (13) is a spur-gear planetary drive spatially disposed between the first (7) and the second gearwheels (8).

3. The power divider according to claim 2, wherein the components of the spur-gear planetary drive connect a carrier (15) to the first gearwheel (7), a ring gear (18) to the second gearwheel (8), and a sun gear (16) to the second input gear (11).

4. The power divider according to claim 3, wherein a locking clutch (14), which is used to lock the differential gear (13), is disposed between the carrier (15) and the sun gear (16).

5. The power divider according to claim 4, wherein the carrier (15) is connected to an auxiliary drive shaft (23) which extends through the second gearwheel (8).

6. The power divider according to claim 5, wherein, when the ring gear (18) is locked, the auxiliary drive shaft (23) transfers torque and the first gearwheel (7) and the second drive gear (11) are decoupled from the sun gear (16).

7. A power divider for a drive of a continuously driven first wheel axle and at least one further engageable wheel axle of a motor vehicle, the power divider comprising:
   an input shaft (1) being drivable by a manual transmission,
   a first output shaft (3) extending coaxially therewith and being used to drive the continuously driven wheel axle,
   an intermediate shaft (6) being assigned to the input shaft (1) and the first output shaft (3) and being disposed in the countershaft,
   a second output shaft (12) being driven by the intermediate shaft (6), via a pair of gears (11, 12b), and being used to drive the further engageable wheel axle,
   the first output shaft (3) being selectively drivable, via a first shifting clutch (2a), with either direct transmission or reduction, the first shifting clutch (2a) is mounted directly on the input shaft (1) and, in an engaged shift position for direct transmission, connecting the input shaft (1) directly to the first output shaft (3), and a first input gear (5), connected in a rotationally fixed manner to the input shaft (1), being engaged with a first gearwheel (7) which is couplable, via a third shifting clutch (2b), to either the intermediate shaft (6) or to a component (15) of a differential gear (13), the first output shaft (3) being drivable at a reduced speed of rotation via the countershaft formed on the intermediate shaft (6),
   a differential gear (13) is disposed within the intermediate shaft (6),
   components (15, 16, 18) of the differential gear being connected to a first (7) and a second gearwheel (8) and to a second input gear (11), and
   the second input gear (11) being engaged with a second output gear (12b) disposed on the second output shaft (12).

8. The power divider according to claim 7, wherein the differential gear (13) is a spur-gear planetary drive spatially disposed between the first (7) and the second gearwheels (8).

9. The power divider according to claim 8, wherein the components of the spur-gear planetary drive connect a carrier (15) to the first gearwheel (7), a ring gear (18) to the second gearwheel (8), and a sun gear (16) to the second input gear (11).

10. The power divider according to claim 9, wherein a locking clutch (14), which is used to lock the differential gear (13), is disposed between the carrier (15) and the sun gear (16).

11. The power divider according to claim 10, wherein the carrier (15) is connected to an auxiliary drive shaft (23) which extends through the second gearwheel (8).

12. The power divider according to claim 11, wherein, when the ring gear (18) is locked, the auxiliary drive shaft (23) transfers torque and the first gearwheel (7) and the second drive gear (11) are decoupled from the sun gear (16).

* * * * *